(12) United States Patent
Zha et al.

(10) Patent No.: US 8,377,305 B2
(45) Date of Patent: *Feb. 19, 2013

(54) CONTINUOUSLY VARIABLE AERATION

(75) Inventors: Fufang Zha, New South Wales (AU); Warren Thomas Johnson, New South Wales (AU); Thomas William Beck, New South Wales (AU); Roger William Phelps, New South Wales (AU); Etienne Ulysse Brois, Yerres (FR)

(73) Assignee: Siemens Industry, Inc., Alpharetta, GA (US)

( * ) Notice: Subject to any disclaimer, the term of this patent is extended or adjusted under 35 U.S.C. 154(b) by 575 days.

This patent is subject to a terminal disclaimer.

(21) Appl. No.: 11/575,364

(22) PCT Filed: Sep. 15, 2005

(86) PCT No.: PCT/AU2005/001405
§ 371 (c)(1),
(2), (4) Date: Mar. 15, 2007

(87) PCT Pub. No.: WO2006/029465
PCT Pub. Date: Mar. 23, 2006

(65) Prior Publication Data
US 2008/0156745 A1    Jul. 3, 2008

(30) Foreign Application Priority Data
Sep. 15, 2004    (AU) ................ 2004905317

(51) Int. Cl.
*B01D 65/02*    (2006.01)
(52) U.S. Cl. .............. 210/636; 210/321.89; 210/321.69; 210/639; 134/22.12

(58) Field of Classification Search .................. 210/138, 210/321.69, 321.8, 321.89, 636, 639, 650, 210/209; 134/1, 22.1, 22.11, 22.12; 261/23.1, 261/28, 43, 59, 64.1, 122.1, 122.2, 124; 137/599, 137/625.11, 625.12, 625.67, 625.68; 55/282, 55/283, 302
See application file for complete search history.

(56) References Cited

U.S. PATENT DOCUMENTS

| 256,008 A | 4/1882 | Leak |
|---|---|---|
| 285,321 A | 9/1883 | Tams |
| 511,995 A | 1/1894 | Buckley |
| 1,997,074 A | 4/1935 | Novotny |
| 2,080,783 A | 5/1937 | Petersen |
| 2,105,700 A | 1/1938 | Ramage |
| 2,843,038 A | 7/1958 | Manspeaker |

(Continued)

FOREIGN PATENT DOCUMENTS

| AU | 34400/84 A | 4/1985 |
|---|---|---|
| AU | 55847/86 A | 9/1986 |

(Continued)

OTHER PUBLICATIONS

International Search Report dated Dec. 14, 2005 for Application No. PCT/AU2005/001405.

(Continued)

*Primary Examiner* — Joseph Drodge (57) ABSTRACT

A method of controlling fouling in a membrane filtration system (5) of the type where gas is used to clean or scour the membranes (6) wherein the method includes supplying the gas to the system with a continuously variable flow rate. A continuously variable valve arrangement (17) is also disclosed.

14 Claims, 7 Drawing Sheets

U.S. PATENT DOCUMENTS

| | | |
|---|---|---|
| 2,926,086 A | 2/1960 | Chenicek et al. |
| 3,068,655 A | 12/1962 | Murray et al. |
| 3,139,401 A | 6/1964 | Hach |
| 3,183,191 A | 5/1965 | Hach |
| 3,191,674 A | 6/1965 | Richardson |
| 3,198,636 A | 8/1965 | Bouthilet |
| 3,228,876 A | 1/1966 | Mahon |
| 3,275,554 A | 9/1966 | Wagenaar |
| 3,442,002 A | 5/1969 | Geary et al. |
| 3,462,362 A | 8/1969 | Kollsman |
| 3,472,168 A | 10/1969 | Inoue et al. |
| 3,472,765 A | 10/1969 | Budd et al. |
| 3,492,698 A | 2/1970 | Geary et al. |
| 3,501,798 A | 3/1970 | Carraro |
| 3,505,215 A | 4/1970 | Bray |
| 3,556,305 A | 1/1971 | Shorr |
| 3,563,860 A | 2/1971 | Henderyckx |
| 3,591,010 A | 7/1971 | Pall et al. |
| 3,625,827 A | 12/1971 | Wildi et al. |
| 3,654,147 A | 4/1972 | Levin |
| 3,679,052 A | 7/1972 | Asper |
| 3,693,406 A | 9/1972 | Tobin, III |
| 3,700,561 A | 10/1972 | Ziffer |
| 3,700,591 A | 10/1972 | Higley |
| 3,708,071 A | 1/1973 | Crowley |
| 3,728,256 A | 4/1973 | Cooper |
| 3,763,055 A | 10/1973 | White et al. |
| 3,791,631 A | 2/1974 | Meyer |
| 3,795,609 A | 3/1974 | Hill et al. |
| 3,804,258 A | 4/1974 | Okuniewski et al. |
| 3,843,809 A | 10/1974 | Luck |
| 3,876,738 A | 4/1975 | Marinaccio et al. |
| 3,955,998 A | 5/1976 | Clampitt et al. |
| 3,968,192 A | 7/1976 | Hoffman, III et al. |
| 3,982,095 A | 9/1976 | Robinson |
| 3,992,301 A | 11/1976 | Shippey et al. |
| 3,993,816 A | 11/1976 | Baudet et al. |
| 4,049,765 A | 9/1977 | Yamazaki |
| 4,076,656 A | 2/1978 | White et al. |
| 4,082,683 A | 4/1978 | Galesloot |
| 4,105,556 A | 8/1978 | O'Amaddio et al. |
| 4,105,731 A | 8/1978 | Yamazaki |
| 4,107,043 A | 8/1978 | McKinney |
| 4,138,460 A | 2/1979 | Tigner |
| 4,157,899 A | 6/1979 | Wheaton |
| 4,183,890 A | 1/1980 | Bollinger |
| 4,188,817 A | 2/1980 | Steigelmann |
| 4,190,411 A | 2/1980 | Fujimoto |
| 4,190,419 A | 2/1980 | Bauer |
| 4,192,750 A | 3/1980 | Elfes et al. |
| 4,193,780 A | 3/1980 | Cotton, Jr. et al. |
| 4,203,848 A | 5/1980 | Grandine, II |
| 4,204,961 A | 5/1980 | Cusato, Jr. |
| 4,218,324 A | 8/1980 | Hartmann et al. |
| 4,226,921 A | 10/1980 | Tsang |
| 4,227,295 A | 10/1980 | Bodnar et al. |
| 4,230,583 A | 10/1980 | Chiolle et al. |
| 4,243,525 A | 1/1981 | Greenberg |
| 4,247,498 A | 1/1981 | Castro |
| 4,248,648 A | 2/1981 | Kopp |
| 4,253,936 A | 3/1981 | Leysen et al. |
| 4,271,026 A | 6/1981 | Chen et al. |
| 4,272,379 A | 6/1981 | Pollock |
| 4,302,336 A | 11/1981 | Kawaguchi et al. |
| 4,315,819 A | 2/1982 | King et al. |
| 4,323,453 A | 4/1982 | Zampini |
| 4,340,479 A | 7/1982 | Pall |
| 4,350,592 A | 9/1982 | Kronsbein |
| 4,353,802 A | 10/1982 | Hara et al. |
| 4,359,359 A | 11/1982 | Gerlach et al. |
| 4,367,139 A | 1/1983 | Graham |
| 4,367,140 A * | 1/1983 | Wilson .................. 210/110 |
| 4,369,605 A | 1/1983 | Opersteny et al. |
| 4,371,427 A | 2/1983 | Holler et al. |
| 4,384,474 A | 5/1983 | Kowalski |
| 4,385,150 A | 5/1983 | Miyake et al. |
| 4,388,189 A | 6/1983 | Kawaguchi et al. |
| 4,389,363 A | 6/1983 | Molthop |
| 4,405,688 A | 9/1983 | Lowery et al. |
| 4,407,975 A | 10/1983 | Yamaguchi |
| 4,414,113 A | 11/1983 | LaTerra |
| 4,414,172 A | 11/1983 | Leason |
| 4,415,452 A | 11/1983 | Heil et al. |
| 4,431,545 A | 2/1984 | Pall et al. |
| 4,451,369 A | 5/1984 | Sekino et al. |
| 4,462,855 A | 7/1984 | Yankowsky et al. |
| 4,467,001 A | 8/1984 | Coplan et al. |
| 4,476,015 A | 10/1984 | Schmitt et al. |
| 4,476,112 A | 10/1984 | Aversano |
| 4,491,522 A | 1/1985 | Ishida et al. |
| 4,496,470 A | 1/1985 | Kapiloff et al. |
| 4,511,471 A | 4/1985 | Muller |
| 4,519,909 A | 5/1985 | Castro |
| 4,539,940 A | 9/1985 | Young |
| 4,540,490 A | 9/1985 | Shibata et al. |
| 4,545,862 A | 10/1985 | Gore et al. |
| 4,547,289 A | 10/1985 | Okano et al. |
| 4,609,465 A | 9/1986 | Miller |
| 4,610,789 A | 9/1986 | Barch |
| 4,614,109 A | 9/1986 | Hofmann |
| 4,623,460 A | 11/1986 | Kuzumoto et al. |
| 4,623,670 A | 11/1986 | Mutoh et al. |
| 4,629,563 A | 12/1986 | Wrasidlo |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis, III |
| 4,650,596 A | 3/1987 | Schlueter et al. |
| 4,656,865 A | 4/1987 | Callan |
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |
| 4,749,487 A | 6/1988 | Lefebvre |
| 4,756,875 A | 7/1988 | Tajima et al. |
| 4,763,612 A | 8/1988 | Iwanami |
| 4,767,539 A | 8/1988 | Ford |
| 4,769,140 A | 9/1988 | van Dijk et al. |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,800,019 A | 1/1989 | Bikson et al. |
| 4,810,384 A | 3/1989 | Fabre |
| 4,812,235 A | 3/1989 | Seleman et al. |
| 4,816,160 A | 3/1989 | Ford et al. |
| 4,824,563 A | 4/1989 | Iwahori et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A | 10/1989 | Ohkubo et al. |
| 4,876,012 A | 10/1989 | Kopp et al. |
| 4,886,601 A | 12/1989 | Iwatsuka et al. |
| 4,888,115 A | 12/1989 | Marinaccio et al. |
| 4,889,620 A | 12/1989 | Schmit et al. |
| 4,904,426 A | 2/1990 | Lundgard et al. |
| 4,908,114 A | 3/1990 | Ayers |
| 4,919,815 A | 4/1990 | Copa et al. |
| 4,921,610 A | 5/1990 | Ford et al. |
| 4,931,186 A | 6/1990 | Ford et al. |

| | | | |
|---|---|---|---|
| 4,933,084 A | 6/1990 | Bandel et al. | |
| 4,935,143 A | 6/1990 | Kopp et al. | |
| 4,952,317 A | 8/1990 | Culkin | |
| 4,963,304 A | 10/1990 | Im et al. | |
| 4,966,699 A | 10/1990 | Sasaki et al. | |
| 4,968,430 A | 11/1990 | Hildenbrand et al. | |
| 4,968,733 A | 11/1990 | Muller et al. | |
| 4,969,997 A | 11/1990 | Kluver et al. | |
| 4,980,066 A * | 12/1990 | Slegers | 210/636 |
| 4,988,444 A | 1/1991 | Applegate et al. | |
| 4,999,038 A | 3/1991 | Lundberg | |
| 5,002,666 A | 3/1991 | Matsumoto et al. | |
| 5,005,430 A | 4/1991 | Kibler et al. | |
| 5,015,275 A | 5/1991 | Beck et al. | |
| 5,024,762 A | 6/1991 | Ford et al. | |
| 5,034,125 A | 7/1991 | Karbachsch et al. | |
| 5,043,113 A | 8/1991 | Kafchinski et al. | |
| 5,059,317 A | 10/1991 | Marius et al. | |
| 5,066,375 A | 11/1991 | Parsi et al. | |
| 5,066,401 A | 11/1991 | Muller et al. | |
| 5,066,402 A | 11/1991 | Anselme et al. | |
| 5,069,065 A | 12/1991 | Sprunt et al. | |
| 5,069,353 A | 12/1991 | Espenan | |
| 5,075,065 A | 12/1991 | Effenberger et al. | |
| 5,076,925 A | 12/1991 | Roesink et al. | |
| 5,079,272 A | 1/1992 | Allegrezza, Jr. et al. | |
| 5,080,770 A | 1/1992 | Culkin | |
| 5,094,750 A | 3/1992 | Kopp et al. | |
| 5,094,867 A | 3/1992 | Detering et al. | |
| 5,098,567 A | 3/1992 | Nishiguchi | |
| 5,102,550 A | 4/1992 | Pizzino et al. | |
| 5,104,535 A | 4/1992 | Cote et al. | |
| 5,104,546 A | 4/1992 | Filson et al. | |
| H1045 H | 5/1992 | Wilson | |
| 5,135,663 A | 8/1992 | Newberth, III et al. | |
| 5,137,631 A | 8/1992 | Eckman et al. | |
| 5,138,870 A | 8/1992 | Lyssy | |
| 5,147,553 A | 9/1992 | Waite | |
| 5,151,191 A | 9/1992 | Sunaoka et al. | |
| 5,151,193 A | 9/1992 | Grobe et al. | |
| 5,156,738 A | 10/1992 | Maxson | |
| 5,158,721 A | 10/1992 | Allegrezza, Jr. et al. | |
| 5,169,528 A | 12/1992 | Karbachsch et al. | |
| 5,169,530 A | 12/1992 | Schucker et al. | |
| 5,180,407 A * | 1/1993 | DeMarco | 55/302 |
| 5,182,019 A | 1/1993 | Cote et al. | |
| 5,186,821 A | 2/1993 | Murphy | |
| 5,192,442 A | 3/1993 | Piccirillo et al. | |
| 5,192,456 A | 3/1993 | Ishida et al. | |
| 5,192,478 A | 3/1993 | Caskey | |
| 5,194,149 A | 3/1993 | Selbie et al. | |
| 5,198,116 A | 3/1993 | Comstock et al. | |
| 5,198,162 A | 3/1993 | Park et al. | |
| 5,203,405 A | 4/1993 | Gentry et al. | |
| 5,209,852 A | 5/1993 | Sunaoka et al. | |
| 5,211,823 A | 5/1993 | Giuffrida et al. | |
| 5,221,478 A | 6/1993 | Dhingra et al. | |
| 5,227,063 A | 7/1993 | Langerak et al. | |
| 5,248,424 A | 9/1993 | Cote et al. | |
| 5,262,054 A | 11/1993 | Wheeler | |
| 5,269,919 A | 12/1993 | von Medlin | |
| 5,271,830 A | 12/1993 | Faivre et al. | |
| 5,275,766 A | 1/1994 | Gadkaree et al. | |
| 5,286,324 A | 2/1994 | Kawai et al. | |
| 5,290,451 A | 3/1994 | Koster et al. | |
| 5,290,457 A | 3/1994 | Karbachsch et al. | |
| 5,297,420 A | 3/1994 | Gilliland et al. | |
| 5,316,671 A | 5/1994 | Murphy | |
| 5,320,760 A | 6/1994 | Freund et al. | |
| 5,353,630 A | 10/1994 | Soda et al. | |
| 5,354,470 A | 10/1994 | Seita et al. | |
| 5,358,732 A | 10/1994 | Seifter et al. | |
| 5,361,625 A | 11/1994 | Ylvisaker | |
| 5,364,527 A | 11/1994 | Zimmermann et al. | |
| 5,364,529 A | 11/1994 | Morin et al. | |
| 5,374,353 A | 12/1994 | Murphy | |
| 5,389,260 A | 2/1995 | Hemp et al. | |
| 5,393,433 A | 2/1995 | Espenan et al. | |
| 5,396,019 A | 3/1995 | Sartori et al. | |
| 5,401,401 A | 3/1995 | Hickok et al. | |
| 5,401,405 A | 3/1995 | McDougald | |
| 5,403,479 A * | 4/1995 | Smith et al. | 210/321.69 |
| 5,405,528 A | 4/1995 | Selbie et al. | |
| 5,411,663 A | 5/1995 | Johnson | |
| 5,417,101 A | 5/1995 | Weich | |
| 5,419,816 A | 5/1995 | Sampson et al. | |
| 5,425,415 A | 6/1995 | Master et al. | |
| 5,451,317 A | 9/1995 | Ishida et al. | |
| 5,458,779 A | 10/1995 | Odegaard | |
| 5,468,397 A | 11/1995 | Barboza et al. | |
| 5,470,469 A | 11/1995 | Eckman | |
| 5,477,731 A | 12/1995 | Mouton | |
| 5,479,590 A | 12/1995 | Lin | |
| 5,480,553 A | 1/1996 | Yamamori et al. | |
| 5,482,625 A | 1/1996 | Shimizu et al. | |
| 5,484,528 A | 1/1996 | Yagi et al. | |
| 5,490,939 A | 2/1996 | Gerigk et al. | |
| 5,491,023 A | 2/1996 | Tsai et al. | |
| 5,501,798 A | 3/1996 | Al-Samadi et al. | |
| 5,525,220 A | 6/1996 | Yagi et al. | |
| 5,531,848 A | 7/1996 | Brinda et al. | |
| 5,531,900 A | 7/1996 | Raghavan et al. | |
| 5,543,002 A | 8/1996 | Brinda et al. | |
| 5,552,047 A | 9/1996 | Oshida et al. | |
| 5,554,283 A | 9/1996 | Brinda et al. | |
| 5,556,591 A | 9/1996 | Jallerat et al. | |
| 5,575,963 A | 11/1996 | Soffer et al. | |
| 5,597,732 A | 1/1997 | Bryan-Brown | |
| 5,607,593 A | 3/1997 | Cote et al. | |
| 5,626,755 A | 5/1997 | Keyser et al. | |
| 5,629,084 A | 5/1997 | Moya | |
| 5,633,163 A | 5/1997 | Cameron | |
| 5,639,373 A | 6/1997 | Mahendran et al. | |
| 5,643,455 A | 7/1997 | Kopp et al. | |
| 5,647,988 A | 7/1997 | Kawanishi et al. | |
| 5,670,053 A | 9/1997 | Collentro et al. | |
| 5,677,360 A | 10/1997 | Yamamori et al. | |
| 5,688,460 A | 11/1997 | Ruschke | |
| 5,690,830 A | 11/1997 | Ohtani et al. | |
| 5,733,456 A | 3/1998 | Okey et al. | |
| 5,744,037 A | 4/1998 | Fujimura et al. | |
| 5,747,605 A | 5/1998 | Breant et al. | |
| 5,766,479 A | 6/1998 | Collentro et al. | |
| D396,046 S | 7/1998 | Scheel et al. | |
| 5,783,083 A | 7/1998 | Henshaw et al. | |
| D396,726 S | 8/1998 | Sadr et al. | |
| 5,814,234 A | 9/1998 | Bower et al. | |
| D400,890 S | 11/1998 | Gambardella | |
| 5,843,069 A | 12/1998 | Butler et al. | |
| 5,846,424 A | 12/1998 | Khudenko | |
| 5,846,425 A | 12/1998 | Whiteman | |
| 5,871,823 A | 2/1999 | Anders et al. | |
| 5,888,401 A | 3/1999 | Nguyen | |
| 5,895,521 A | 4/1999 | Otsuka et al. | |
| 5,895,570 A | 4/1999 | Liang | |
| 5,906,739 A | 5/1999 | Osterland et al. | |
| 5,906,742 A | 5/1999 | Wang et al. | |
| 5,910,250 A | 6/1999 | Mahendran et al. | |
| 5,914,039 A | 6/1999 | Mahendran et al. | |
| 5,918,264 A | 6/1999 | Drummond et al. | |
| 5,942,113 A | 8/1999 | Morimura | |
| 5,944,997 A | 8/1999 | Pedersen et al. | |
| 5,951,878 A | 9/1999 | Astrom | |
| 5,958,243 A | 9/1999 | Lawrence et al. | |
| 5,961,830 A | 10/1999 | Barnett | |
| 5,968,357 A | 10/1999 | Doelle et al. | |
| 5,988,400 A | 11/1999 | Karachevtcev et al. | |
| 5,989,428 A | 11/1999 | Goronszy | |
| 5,997,745 A | 12/1999 | Tonelli et al. | |
| 6,001,254 A | 12/1999 | Espenan et al. | |
| 6,007,712 A | 12/1999 | Tanaka et al. | |
| 6,017,451 A | 1/2000 | Kopf | |
| 6,024,872 A | 2/2000 | Mahendran et al. | |
| 6,036,030 A | 3/2000 | Stone et al. | |
| 6,039,872 A | 3/2000 | Wu et al. | |
| 6,042,677 A | 3/2000 | Mahendran et al. | |
| 6,045,698 A | 4/2000 | Cote et al. | |
| 6,045,899 A | 4/2000 | Wang et al. | |

| | | | |
|---|---|---|---|
| 6,048,454 A | 4/2000 | Jenkins | |
| 6,048,455 A | 4/2000 | Janik | |
| 6,066,401 A | 5/2000 | Stilburn | |
| 6,071,404 A | 6/2000 | Tsui | |
| 6,074,718 A | 6/2000 | Puglia et al. | |
| 6,077,435 A | 6/2000 | Beck et al. | |
| 6,083,393 A | 7/2000 | Wu et al. | |
| 6,096,213 A | 8/2000 | Radovanovic et al. | |
| 6,113,782 A | 9/2000 | Leonard | |
| 6,120,688 A | 9/2000 | Daly et al. | |
| 6,126,819 A | 10/2000 | Heine et al. | |
| 6,146,747 A | 11/2000 | Wang et al. | |
| 6,149,817 A | 11/2000 | Peterson et al. | |
| 6,156,200 A * | 12/2000 | Zha et al. | 210/321.89 |
| 6,159,373 A | 12/2000 | Beck et al. | |
| 6,193,890 B1 | 2/2001 | Pedersen et al. | |
| 6,202,475 B1 | 3/2001 | Selbie et al. | |
| 6,214,231 B1 | 4/2001 | Cote et al. | |
| 6,214,232 B1 | 4/2001 | Baurmeister et al. | |
| 6,221,247 B1 | 4/2001 | Nemser et al. | |
| 6,245,239 B1 * | 6/2001 | Cote et al. | 210/636 |
| 6,254,773 B1 | 7/2001 | Biltoft | |
| 6,264,839 B1 | 7/2001 | Mohr et al. | |
| 6,277,512 B1 | 8/2001 | Hamrock et al. | |
| 6,280,626 B1 | 8/2001 | Miyashita et al. | |
| 6,284,135 B1 | 9/2001 | Ookata | |
| 6,290,756 B1 | 9/2001 | Macheras et al. | |
| 6,294,039 B1 | 9/2001 | Mahendran et al. | |
| 6,299,773 B1 | 10/2001 | Takamura et al. | |
| 6,303,026 B1 | 10/2001 | Lindbo | |
| 6,303,035 B1 | 10/2001 | Cote et al. | |
| 6,315,895 B1 | 11/2001 | Summerton et al. | |
| 6,319,411 B1 | 11/2001 | Cote | |
| 6,322,703 B1 | 11/2001 | Taniguchi et al. | |
| 6,324,898 B1 | 12/2001 | Cote et al. | |
| 6,325,928 B1 | 12/2001 | Pedersen et al. | |
| 6,325,938 B1 | 12/2001 | Miyashita et al. | |
| 6,331,248 B1 | 12/2001 | Taniguchi et al. | |
| 6,337,018 B1 | 1/2002 | Mickols | |
| RE37,549 E | 2/2002 | Mahendran et al. | |
| 6,349,835 B1 | 2/2002 | Saux et al. | |
| 6,354,444 B1 | 3/2002 | Mahendran et al. | |
| 6,361,695 B1 | 3/2002 | Husain et al. | |
| 6,368,819 B1 | 4/2002 | Gaddy et al. | |
| 6,372,138 B1 | 4/2002 | Cho et al. | |
| 6,375,848 B1 | 4/2002 | Cote et al. | |
| 6,383,369 B2 | 5/2002 | Elston | |
| 6,387,189 B1 | 5/2002 | Groschl et al. | |
| 6,402,955 B2 | 6/2002 | Ookata | |
| 6,406,629 B1 | 6/2002 | Husain et al. | |
| 6,423,214 B1 | 7/2002 | Lindbo | |
| 6,423,784 B1 | 7/2002 | Hamrock et al. | |
| 6,432,310 B1 | 8/2002 | Andou et al. | |
| 6,440,303 B2 | 8/2002 | Spriegel | |
| D462,699 S | 9/2002 | Johnson et al. | |
| 6,444,124 B1 | 9/2002 | Onyeche et al. | |
| 6,468,430 B1 | 10/2002 | Kimura et al. | |
| 6,471,869 B1 | 10/2002 | Yanou et al. | |
| 6,485,645 B1 | 11/2002 | Husain et al. | |
| 6,495,041 B2 | 12/2002 | Taniguchi et al. | |
| 6,517,723 B1 | 2/2003 | Daigger et al. | |
| 6,524,481 B2 | 2/2003 | Zha et al. | |
| 6,524,733 B1 | 2/2003 | Nonobe | |
| 6,550,747 B2 * | 4/2003 | Rabie et al. | 261/23.1 |
| 6,555,005 B1 * | 4/2003 | Zha et al. | 210/636 |
| 6,562,237 B1 | 5/2003 | Olaopa | |
| 6,576,136 B1 | 6/2003 | De Moel et al. | |
| 6,592,762 B2 | 7/2003 | Smith | |
| D478,913 S | 8/2003 | Johnson et al. | |
| 6,613,222 B2 | 9/2003 | Mikkelson et al. | |
| 6,620,319 B2 | 9/2003 | Behmann et al. | |
| 6,623,643 B2 | 9/2003 | Chrisholm et al. | |
| 6,627,082 B2 | 9/2003 | Del Vecchio et al. | |
| 6,632,358 B1 | 10/2003 | Suga et al. | |
| 6,635,179 B1 | 10/2003 | Summerton et al. | |
| 6,641,733 B2 | 11/2003 | Zha et al. | |
| 6,645,374 B2 | 11/2003 | Cote et al. | |
| 6,656,356 B2 | 12/2003 | Gungerich et al. | |
| 6,682,652 B2 | 1/2004 | Mahendran et al. | |
| 6,685,832 B2 | 2/2004 | Mahendran et al. | |
| 6,696,465 B2 | 2/2004 | Dellaria et al. | |
| 6,702,561 B2 | 3/2004 | Stillig et al. | |
| 6,706,185 B2 | 3/2004 | Goel et al. | |
| 6,706,189 B2 | 3/2004 | Rabie et al. | |
| 6,708,957 B2 | 3/2004 | Cote et al. | |
| 6,712,970 B1 | 3/2004 | Trivedi | |
| 6,721,529 B2 | 4/2004 | Chen et al. | |
| 6,723,242 B1 | 4/2004 | Ohkata et al. | |
| 6,723,758 B2 | 4/2004 | Stone et al. | |
| 6,727,305 B1 | 4/2004 | Pavez Aranguiz | |
| 6,743,362 B1 | 6/2004 | Porteous et al. | |
| 6,755,970 B1 | 6/2004 | Knappe et al. | |
| 6,758,972 B2 | 7/2004 | Vriens et al. | |
| 6,761,826 B2 | 7/2004 | Bender | |
| 6,770,202 B1 | 8/2004 | Kidd et al. | |
| 6,780,466 B2 | 8/2004 | Grangeon et al. | |
| 6,783,008 B2 | 8/2004 | Zha et al. | |
| 6,790,347 B2 | 9/2004 | Jeong et al. | |
| 6,790,912 B2 | 9/2004 | Blong | |
| 6,805,806 B2 | 10/2004 | Arnaud | |
| 6,808,629 B2 | 10/2004 | Wouters-Wasiak et al. | |
| 6,811,696 B2 | 11/2004 | Wang et al. | |
| 6,814,861 B2 | 11/2004 | Husain et al. | |
| 6,821,420 B2 | 11/2004 | Zha et al. | |
| 6,830,782 B2 | 12/2004 | Kanazawa | |
| 6,841,070 B2 | 1/2005 | Zha et al. | |
| 6,861,466 B2 | 3/2005 | Dadalas et al. | |
| 6,863,816 B2 | 3/2005 | Austin et al. | |
| 6,863,817 B2 * | 3/2005 | Liu et al. | 210/605 |
| 6,863,818 B2 | 3/2005 | Daigger et al. | |
| 6,863,823 B2 | 3/2005 | Cote | |
| 6,869,534 B2 | 3/2005 | McDowell et al. | |
| 6,872,305 B2 | 3/2005 | Johnson et al. | |
| 6,881,343 B2 | 4/2005 | Rabie et al. | |
| 6,884,350 B2 | 4/2005 | Muller | |
| 6,884,375 B2 | 4/2005 | Wang et al. | |
| 6,890,435 B2 | 5/2005 | Ji et al. | |
| 6,890,645 B2 | 5/2005 | Disse et al. | |
| 6,893,568 B1 | 5/2005 | Janson et al. | |
| 6,899,812 B2 | 5/2005 | Cote et al. | |
| 6,936,085 B2 * | 8/2005 | DeMarco | 55/324 |
| 6,946,073 B2 | 9/2005 | Daigger et al. | |
| 6,952,258 B2 | 10/2005 | Ebert et al. | |
| 6,955,762 B2 | 10/2005 | Gallagher et al. | |
| 6,962,258 B2 | 11/2005 | Zha et al. | |
| 6,964,741 B2 | 11/2005 | Mahendran et al. | |
| 6,969,465 B2 | 11/2005 | Zha et al. | |
| 6,974,554 B2 | 12/2005 | Cox et al. | |
| 6,994,867 B1 | 2/2006 | Hossainy et al. | |
| 7,005,100 B2 | 2/2006 | Lowell | |
| 7,014,763 B2 | 3/2006 | Johnson et al. | |
| 7,018,530 B2 | 3/2006 | Pollock | |
| 7,018,533 B2 | 3/2006 | Johnson et al. | |
| 7,022,233 B2 | 4/2006 | Chen | |
| 7,041,728 B2 | 5/2006 | Zipplies et al. | |
| 7,052,610 B2 | 5/2006 | Janson et al. | |
| 7,083,733 B2 | 8/2006 | Freydina et al. | |
| 7,087,173 B2 | 8/2006 | Cote et al. | |
| 7,122,121 B1 | 10/2006 | Ji | |
| 7,147,777 B1 | 12/2006 | Porteous | |
| 7,147,778 B1 | 12/2006 | DiMassimo et al. | |
| 7,160,455 B2 | 1/2007 | Taniguchi et al. | |
| 7,160,463 B2 | 1/2007 | Beck et al. | |
| 7,160,464 B2 | 1/2007 | Lee et al. | |
| 7,172,699 B1 | 2/2007 | Trivedi et al. | |
| 7,172,701 B2 | 2/2007 | Gaid et al. | |
| 7,186,344 B2 | 3/2007 | Hughes | |
| 7,208,091 B2 | 4/2007 | Pind et al. | |
| 7,223,340 B2 | 5/2007 | Zha et al. | |
| 7,226,541 B2 | 6/2007 | Muller et al. | |
| 7,247,238 B2 | 7/2007 | Mullette et al. | |
| 7,264,716 B2 | 9/2007 | Johnson et al. | |
| 7,279,100 B2 | 10/2007 | Devine | |
| 7,279,215 B2 | 10/2007 | Hester et al. | |
| 7,300,022 B2 | 11/2007 | Muller | |
| 7,314,563 B2 | 1/2008 | Cho et al. | |
| 7,329,344 B2 | 2/2008 | Jordan et al. | |
| 7,344,645 B2 | 3/2008 | Beck et al. | |

| | | |
|---|---|---|
| 7,361,274 B2 | 4/2008 | Lazaredes |
| 7,378,024 B2 | 5/2008 | Bartels et al. |
| 7,387,723 B2 | 6/2008 | Jordan |
| 7,404,896 B2 | 7/2008 | Muller |
| 7,410,584 B2 | 8/2008 | Devine |
| 7,455,765 B2 | 11/2008 | Elefritz et al. |
| 7,481,933 B2 | 1/2009 | Barnes |
| 7,507,274 B2 | 3/2009 | Tonkovich et al. |
| 7,510,655 B2 | 3/2009 | Barnes |
| 7,531,042 B2 * | 5/2009 | Murkute et al. ............ 134/1 |
| 7,563,363 B2 | 7/2009 | Kuzma |
| 7,591,950 B2 | 9/2009 | Zha et al. |
| 7,632,439 B2 | 12/2009 | Mullette et al. |
| 7,648,634 B2 | 1/2010 | Probst |
| 7,662,212 B2 | 2/2010 | Mullette et al. |
| 7,708,887 B2 | 5/2010 | Johnson et al. |
| 7,713,413 B2 | 5/2010 | Barnes |
| 7,718,057 B2 | 5/2010 | Jordan et al. |
| 7,718,065 B2 | 5/2010 | Jordan |
| 7,722,769 B2 | 5/2010 | Jordan et al. |
| 7,761,826 B1 | 7/2010 | Thanvantri et al. |
| 7,819,956 B2 | 10/2010 | Muller |
| 7,850,851 B2 | 12/2010 | Zha et al. |
| 7,862,719 B2 | 1/2011 | McMahon et al. |
| 7,931,463 B2 | 4/2011 | Cox et al. |
| 7,938,966 B2 | 5/2011 | Johnson |
| 2001/0047962 A1 | 12/2001 | Zha et al. |
| 2001/0052494 A1 | 12/2001 | Cote et al. |
| 2002/0070157 A1 | 6/2002 | Yamada |
| 2002/0117444 A1 | 8/2002 | Mikkelson et al. |
| 2002/0148767 A1 | 10/2002 | Johnson et al. |
| 2002/0153313 A1 | 10/2002 | Cote ............................ 210/636 |
| 2002/0185435 A1 | 12/2002 | Husain et al. |
| 2002/0189999 A1 | 12/2002 | Espenan et al. |
| 2002/0195390 A1 | 12/2002 | Zha et al. |
| 2003/0038080 A1 | 2/2003 | Vriens et al. |
| 2003/0042199 A1 | 3/2003 | Smith |
| 2003/0052055 A1 | 3/2003 | Akamatsu et al. |
| 2003/0056919 A1 | 3/2003 | Beck |
| 2003/0057155 A1 | 3/2003 | Husain et al. |
| 2003/0075495 A1 | 4/2003 | Dannstrom et al. |
| 2003/0121855 A1 | 7/2003 | Kopp |
| 2003/0127388 A1 | 7/2003 | Ando et al. |
| 2003/0146153 A1 | 8/2003 | Cote et al. |
| 2003/0150807 A1 | 8/2003 | Bartels et al. |
| 2003/0159988 A1 | 8/2003 | Daigger et al. |
| 2003/0178365 A1 | 9/2003 | Zha et al. |
| 2003/0196955 A1 | 10/2003 | Hughes |
| 2003/0226797 A1 | 12/2003 | Phelps |
| 2003/0234221 A1 | 12/2003 | Johnson et al. |
| 2004/0007523 A1 | 1/2004 | Gabon et al. |
| 2004/0007525 A1 | 1/2004 | Rabie et al. |
| 2004/0035770 A1 | 2/2004 | Edwards et al. |
| 2004/0045893 A1 | 3/2004 | Watanabe et al. |
| 2004/0050791 A1 | 3/2004 | Herczeg |
| 2004/0055974 A1 | 3/2004 | Del Vecchio et al. |
| 2004/0084369 A1 | 5/2004 | Zha et al. |
| 2004/0108268 A1 | 6/2004 | Liu et al. |
| 2004/0112831 A1 | 6/2004 | Rabie et al. .................. 210/636 |
| 2004/0139992 A1 | 7/2004 | Murkute et al. |
| 2004/0145076 A1 | 7/2004 | Zha et al. |
| 2004/0149655 A1 | 8/2004 | Petrucco et al. |
| 2004/0154671 A1 | 8/2004 | Martins et al. .......... 137/625.47 |
| 2004/0168978 A1 | 9/2004 | Gray |
| 2004/0168979 A1 | 9/2004 | Zha et al. |
| 2004/0173525 A1 | 9/2004 | Hunniford et al. |
| 2004/0178154 A1 | 9/2004 | Zha et al. |
| 2004/0188341 A1 | 9/2004 | Zha et al. |
| 2004/0211726 A1 | 10/2004 | Baig et al. |
| 2004/0217053 A1 | 11/2004 | Zha et al. |
| 2004/0222158 A1 | 11/2004 | Husain et al. |
| 2004/0232076 A1 * | 11/2004 | Zha et al. ...................... 210/636 |
| 2004/0238442 A1 | 12/2004 | Johnson et al. |
| 2004/0245174 A1 | 12/2004 | Takayama et al. |
| 2005/0006308 A1 * | 1/2005 | Cote et al. .................... 210/636 |
| 2005/0023219 A1 | 2/2005 | Kirker et al. |
| 2005/0029185 A1 | 2/2005 | Muller |
| 2005/0029186 A1 | 2/2005 | Muller |
| 2005/0032982 A1 | 2/2005 | Muller |
| 2005/0045557 A1 | 3/2005 | Daigger et al. |
| 2005/0053878 A1 | 3/2005 | Bruun et al. |
| 2005/0061725 A1 | 3/2005 | Liu et al. |
| 2005/0077227 A1 | 4/2005 | Kirker et al. |
| 2005/0098494 A1 | 5/2005 | Mullette et al. |
| 2005/0103722 A1 | 5/2005 | Freydina et al. |
| 2005/0109692 A1 | 5/2005 | Zha et al. |
| 2005/0115880 A1 | 6/2005 | Pollock |
| 2005/0115899 A1 | 6/2005 | Liu et al. |
| 2005/0121389 A1 | 6/2005 | Janson et al. |
| 2005/0126963 A1 | 6/2005 | Phagoo et al. |
| 2005/0139538 A1 | 6/2005 | Lazaredes |
| 2005/0184008 A1 | 8/2005 | Schacht et al. |
| 2005/0194310 A1 | 9/2005 | Yamamoto et al. |
| 2005/0194315 A1 | 9/2005 | Adams et al. |
| 2005/0258098 A1 | 11/2005 | Vincent et al. |
| 2006/0000775 A1 | 1/2006 | Zha et al. |
| 2006/0021929 A1 | 2/2006 | Mannheim et al. |
| 2006/0065596 A1 | 3/2006 | Kent et al. |
| 2006/0081533 A1 | 4/2006 | Khudenko |
| 2006/0131234 A1 | 6/2006 | Zha et al. |
| 2006/0201876 A1 | 9/2006 | Jordan |
| 2006/0201879 A1 | 9/2006 | Den Boestert et al. |
| 2006/0249448 A1 | 11/2006 | Fujishima et al. |
| 2006/0249449 A1 | 11/2006 | Nakhla et al. |
| 2006/0261007 A1 | 11/2006 | Zha et al. |
| 2006/0273007 A1 | 12/2006 | Zha et al. |
| 2006/0273038 A1 | 12/2006 | Syed et al. |
| 2007/0007205 A1 | 1/2007 | Johnson et al. |
| 2007/0007214 A1 | 1/2007 | Zha et al. |
| 2007/0039888 A1 | 2/2007 | Ginzburg et al. |
| 2007/0045183 A1 | 3/2007 | Murphy |
| 2007/0051679 A1 | 3/2007 | Adams et al. |
| 2007/0056904 A1 | 3/2007 | Hogt et al. |
| 2007/0056905 A1 | 3/2007 | Beck et al. |
| 2007/0075017 A1 | 4/2007 | Kuzma |
| 2007/0075021 A1 | 4/2007 | Johnson |
| 2007/0084791 A1 | 4/2007 | Jordan et al. |
| 2007/0084795 A1 | 4/2007 | Jordan |
| 2007/0108125 A1 | 5/2007 | Cho et al. |
| 2007/0131614 A1 | 6/2007 | Knappe et al. |
| 2007/0138090 A1 | 6/2007 | Jordan et al. |
| 2007/0170112 A1 | 7/2007 | Elefritz et al. |
| 2007/0181496 A1 | 8/2007 | Zuback |
| 2007/0227973 A1 | 10/2007 | Zha et al. |
| 2008/0053923 A1 | 3/2008 | Beck et al. |
| 2008/0093297 A1 | 4/2008 | Gock et al. |
| 2008/0179249 A1 | 7/2008 | Beck et al. |
| 2008/0190846 A1 | 8/2008 | Cox et al. |
| 2008/0203017 A1 | 8/2008 | Zha et al. |
| 2008/0257822 A1 | 10/2008 | Johnson |
| 2008/0277340 A1 | 11/2008 | Hong et al. |
| 2009/0001018 A1 | 1/2009 | Zha et al. |
| 2009/0194477 A1 | 8/2009 | Hashimoto |
| 2009/0223895 A1 | 9/2009 | Zha et al. |
| 2009/0255873 A1 | 10/2009 | Biltoft et al. |
| 2010/0000941 A1 | 1/2010 | Muller |
| 2010/0012585 A1 | 1/2010 | Zha et al. |
| 2010/0025320 A1 | 2/2010 | Johnson |
| 2010/0051545 A1 | 3/2010 | Johnson et al. |
| 2010/0170847 A1 | 7/2010 | Zha et al. |
| 2010/0200503 A1 | 8/2010 | Zha et al. |
| 2010/0300968 A1 | 12/2010 | Liu et al. |
| 2010/0326906 A1 | 12/2010 | Barnes |
| 2011/0023913 A1 | 2/2011 | Fulling |
| 2011/0049047 A1 | 3/2011 | Cumin et al. |
| 2011/0056522 A1 | 3/2011 | Zauner et al. |
| 2011/0100907 A1 | 5/2011 | Zha et al. |
| 2011/0114557 A2 | 5/2011 | Johnson et al. |
| 2011/0127209 A1 | 6/2011 | Rogers et al. |
| 2011/0132826 A1 | 6/2011 | Muller et al. |
| 2011/0139715 A1 | 6/2011 | Zha et al. |
| 2011/0192783 A1 | 8/2011 | Cox et al. |
| 2011/0198283 A1 | 8/2011 | Zha et al. |
| 2012/0091602 A1 | 4/2012 | Cumin et al. |

FOREIGN PATENT DOCUMENTS

| | | |
|---|---|---|
| AU | 77066/87 A | 2/1988 |
| AU | 762091 B2 | 6/2003 |

| | | | | | | |
|---|---|---|---|---|---|---|
| AU | 2004289373 | A1 | 5/2005 | JP | 56121685 A | 9/1981 |
| CA | 2460207 | A1 | 3/2003 | JP | 57190697 A | 11/1982 |
| CA | 2531764 | A1 | 3/2005 | JP | 58088007 A | 5/1983 |
| CN | 86104888 | A | 2/1988 | JP | 60019002 A | 1/1985 |
| CN | 1050770 | | 1/1995 | JP | 60-206412 A | 10/1985 |
| CN | 2204898 | Y | 8/1995 | JP | 60260628 A | 12/1985 |
| CN | 2236049 | Y | 9/1996 | JP | 61097005 A | 5/1986 |
| CN | 1159769 | A | 9/1997 | JP | 61097006 A | 5/1986 |
| CN | 1244814 | A | 2/2000 | JP | 61107905 A | 5/1986 |
| CN | 1249698 | A | 4/2000 | JP | 61167406 A | 7/1986 |
| CN | 1265636 | A | 9/2000 | JP | 61167407 A | 7/1986 |
| CN | 1319032 | A | 10/2001 | JP | 61171504 A | 8/1986 |
| CN | 1541757 | A | 11/2004 | JP | 61192309 A | 8/1986 |
| DE | 3904544 | A1 | 8/1990 | JP | 61222510 A | 10/1986 |
| DE | 4117281 | A1 | 1/1992 | JP | 61242607 A | 10/1986 |
| DE | 4113420 | A1 | 10/1992 | JP | 61249505 A | 11/1986 |
| DE | 4117422 | C1 | 11/1992 | JP | 61257203 A | 11/1986 |
| DE | 4326603 | A1 | 2/1995 | JP | 61263605 A | 11/1986 |
| DE | 19503060 | A1 | 8/1996 | JP | 61291007 A | 12/1986 |
| DE | 29804927 | U1 | 6/1998 | JP | 61293504 A | 12/1986 |
| DE | 29906389 | U1 | 6/1999 | JP | 62004408 A | 1/1987 |
| DE | 10045227 | C1 | 2/2002 | JP | 62068828 A | 3/1987 |
| DE | 10209170 | C1 | 8/2003 | JP | 62114609 A | 5/1987 |
| DE | 202004012693 | U1 | 10/2004 | JP | 62140607 A | 6/1987 |
| EP | 012557 | B1 | 2/1983 | JP | 62144708 A | 6/1987 |
| EP | 126714 | A2 | 11/1984 | JP | 62163708 A | 7/1987 |
| EP | 050447 | B1 | 10/1985 | JP | 62179540 A | 8/1987 |
| EP | 194735 | A2 | 9/1986 | JP | 62237908 A | 10/1987 |
| EP | 250337 | A1 | 12/1987 | JP | 62250908 A | 10/1987 |
| EP | 327025 | A1 | 8/1989 | JP | 62187606 | 11/1987 |
| EP | 344633 | A1 | 12/1989 | JP | 62262710 | 11/1987 |
| EP | 090383 | B1 | 5/1990 | JP | 63-93307 | 4/1988 |
| EP | 407900 | A2 | 1/1991 | JP | 63097634 A | 4/1988 |
| EP | 463627 | A2 | 1/1992 | JP | 63099246 A | 4/1988 |
| EP | 0464321 | A1 | 1/1992 | JP | 63143905 A | 6/1988 |
| EP | 492942 | A2 | 7/1992 | JP | 63-1602 | 7/1988 |
| EP | 518250 | B1 | 12/1992 | JP | 63171607 A | 7/1988 |
| EP | 547575 | A1 | 6/1993 | JP | 63180254 A | 7/1988 |
| EP | 280052 | B1 | 7/1994 | JP | S63-38884 | 10/1988 |
| EP | 395133 | B1 | 2/1995 | JP | 64-075542 A | 3/1989 |
| EP | 662341 | A1 | 7/1995 | JP | 1-501046 T | 4/1989 |
| EP | 492446 | B1 | 11/1995 | JP | 1111494 A | 4/1989 |
| EP | 430082 | B1 | 6/1996 | JP | 01151906 A | 6/1989 |
| EP | 734758 | A1 | 10/1996 | JP | 01-307409 | 12/1989 |
| EP | 763758 | A1 | 3/1997 | JP | 02-017925 | 1/1990 |
| EP | 824956 | A2 | 2/1998 | JP | 02017924 | 1/1990 |
| EP | 0848194 | | 6/1998 | JP | 02026625 A | 1/1990 |
| EP | 855214 | A1 | 7/1998 | JP | 02031200 A | 2/1990 |
| EP | 627255 | B1 | 1/1999 | JP | 02040296 A | 2/1990 |
| EP | 911073 | A1 | 4/1999 | JP | 02107318 A | 4/1990 |
| EP | 920904 | A2 | 6/1999 | JP | 02126922 A | 5/1990 |
| EP | 0937494 | A2 | 8/1999 | JP | 02144132 A | 6/1990 |
| EP | 1034835 | A1 | 9/2000 | JP | 02164423 A | 6/1990 |
| EP | 1052012 | A1 | 11/2000 | JP | 02174918 A | 7/1990 |
| EP | 1156015 | A1 | 11/2001 | JP | 02241523 A | 9/1990 |
| EP | 1300186 | A1 | 4/2003 | JP | 02277528 A | 11/1990 |
| EP | 1349644 | B1 | 10/2003 | JP | 02284035 A | 11/1990 |
| EP | 1350555 | A1 | 10/2003 | JP | 03018373 A | 1/1991 |
| EP | 1236503 | B1 | 8/2004 | JP | 03028797 A | 2/1991 |
| EP | 1445240 | | 8/2004 | JP | 03-086529 A | 4/1991 |
| EP | 1466658 | A1 | 10/2004 | JP | 03110445 A | 5/1991 |
| EP | 1659171 | A1 | 5/2006 | JP | 11031025 A | 2/1992 |
| EP | 1420874 | B1 | 1/2011 | JP | 04108518 A | 4/1992 |
| FR | 2620712 | A1 | 3/1989 | JP | 04110023 A | 4/1992 |
| FR | 2674448 | A1 | 10/1992 | JP | 4-190889 A | 7/1992 |
| FR | 2699424 | A1 | 6/1994 | JP | 04187224 A | 7/1992 |
| FR | 2762834 | A1 | 11/1998 | JP | 4-256425 A | 9/1992 |
| GB | 702911 | A | 1/1954 | JP | 04250898 A | 9/1992 |
| GB | 996195 | A | 6/1965 | JP | 04256424 A | 9/1992 |
| GB | 2253572 | A | 9/1992 | JP | 04265128 A | 9/1992 |
| JP | 52-078677 | A | 7/1977 | JP | 04293527 A | 10/1992 |
| JP | 53-5077 | | 1/1978 | JP | 04310223 A | 11/1992 |
| JP | 53108882 | A | 9/1978 | JP | 04317793 A | 11/1992 |
| JP | 54162684 | A | 12/1979 | JP | 04334530 A | 11/1992 |
| JP | 55099703 | A | 7/1980 | JP | 04348252 A | 12/1992 |
| JP | 55129107 | A | 10/1980 | JP | 05023557 A | 2/1993 |
| JP | 55129155 | A | 10/1980 | JP | 05096136 A | 4/1993 |
| JP | 56021604 | A | 2/1981 | JP | 05137977 A | 6/1993 |
| JP | 56118701 | A | 9/1981 | JP | 05157654 A | 6/1993 |

| | | | | | | |
|---|---|---|---|---|---|---|
| JP | 05161831 | A | 6/1993 | JP | 11033367 A | 2/1999 |
| JP | 05184884 | A | 7/1993 | JP | 11076769 A | 3/1999 |
| JP | 05279447 | A | 10/1993 | JP | 11076770 A | 3/1999 |
| JP | 05285348 | A | 11/1993 | JP | 11156166 A | 6/1999 |
| JP | 05305221 | A | 11/1993 | JP | 11156360 A | 6/1999 |
| JP | 06-027215 | A | 2/1994 | JP | 11165200 A | 6/1999 |
| JP | 06071120 | A | 3/1994 | JP | 11-179171 A | 7/1999 |
| JP | 06114240 | A | 4/1994 | JP | 11300177 A | 11/1999 |
| JP | 06170364 | A | 6/1994 | JP | 11302438 A | 11/1999 |
| JP | 06190250 | A | 7/1994 | JP | 11309351 A | 11/1999 |
| JP | 06218237 | A | 8/1994 | JP | 11319501 A | 11/1999 |
| JP | 06238273 | A | 8/1994 | JP | 11319507 A | 11/1999 |
| JP | 06-292820 | A | 10/1994 | JP | 11333265 A | 12/1999 |
| JP | 06277469 | A | 10/1994 | JP | 2000000439 A | 1/2000 |
| JP | 06285496 | A | 10/1994 | JP | 200051670 | 2/2000 |
| JP | 06343837 | A | 12/1994 | JP | 2000051669 A | 2/2000 |
| JP | 07000770 | A | 1/1995 | JP | 2000061466 A | 2/2000 |
| JP | 07024272 | A | 1/1995 | JP | 200079390 A | 3/2000 |
| JP | 07047247 | A | 2/1995 | JP | 2000070684 A | 3/2000 |
| JP | 07068139 | A | 3/1995 | JP | 2000-093758 | 4/2000 |
| JP | 07136470 | A | 5/1995 | JP | 2000-157845 | 6/2000 |
| JP | 07136471 | A | 5/1995 | JP | 2000157850 A | 6/2000 |
| JP | 07155564 | A | 6/1995 | JP | 2000185220 A | 7/2000 |
| JP | 07155758 | A | 6/1995 | JP | 2000189958 A | 7/2000 |
| JP | 7-39921 | | 7/1995 | JP | 2000233020 A | 8/2000 |
| JP | 07178323 | A | 7/1995 | JP | 2000237548 A | 9/2000 |
| JP | 07185268 | A | 7/1995 | JP | 2000300968 A | 10/2000 |
| JP | 07185270 | A | 7/1995 | JP | 2000317276 A | 11/2000 |
| JP | 07185271 | A | 7/1995 | JP | 2000334276 A | 12/2000 |
| JP | 07185272 | A | 7/1995 | JP | 2000342932 A | 12/2000 |
| JP | 07204635 | A | 8/1995 | JP | 2001009246 A | 1/2001 |
| JP | 07236819 | A | 9/1995 | JP | 2001070967 A | 3/2001 |
| JP | 07-256253 | | 10/1995 | JP | 2001079366 A | 3/2001 |
| JP | 07251043 | A | 10/1995 | JP | 2001079367 A | 3/2001 |
| JP | 07275665 | A | 10/1995 | JP | 2001104760 A | 4/2001 |
| JP | 07289860 | A | 11/1995 | JP | 2001120963 A | 5/2001 |
| JP | 07303895 | A | 11/1995 | JP | 2001-510396 T | 7/2001 |
| JP | 07313973 | A | 12/1995 | JP | 2001179059 A | 7/2001 |
| JP | 08010585 | A | 1/1996 | JP | 2001179060 A | 7/2001 |
| JP | 8039089 | A | 2/1996 | JP | 2001190937 A | 7/2001 |
| JP | 08197053 | A | 8/1996 | JP | 2001190938 A | 7/2001 |
| JP | 08332357 | A | 12/1996 | JP | 2001205055 A | 7/2001 |
| JP | 083231161 | A | 12/1996 | JP | 2001-269546 | 10/2001 |
| JP | 09000890 | A | 1/1997 | JP | 2002177746 A | 6/2002 |
| JP | 09038470 | A | 2/1997 | JP | 3302992 B2 | 7/2002 |
| JP | 09072993 | A | 3/1997 | JP | 2002-527229 A | 8/2002 |
| JP | 09075689 | A | 3/1997 | JP | 2002525197 T | 8/2002 |
| JP | 09099227 | A | 4/1997 | JP | 2002263407 A | 9/2002 |
| JP | 09103655 | A | 4/1997 | JP | 2002-336663 | 11/2002 |
| JP | 09103661 | A | 4/1997 | JP | 2003024751 | 1/2003 |
| JP | 9117647 | A | 5/1997 | JP | 2003047830 A | 2/2003 |
| JP | 9138298 | A | 5/1997 | JP | 2003053157 A | 2/2003 |
| JP | 09141063 | A | 6/1997 | JP | 2003053160 A | 2/2003 |
| JP | 09155345 | A | 6/1997 | JP | 200371254 | 3/2003 |
| JP | 09187628 | A | 7/1997 | JP | 2003062436 A | 3/2003 |
| JP | 09192458 | A | 7/1997 | JP | 2003135935 A | 5/2003 |
| JP | 09220569 | A | 8/1997 | JP | 2003190976 A | 7/2003 |
| JP | 09271641 | A | 10/1997 | JP | 2003-265597 | 9/2003 |
| JP | 09313902 | A | 12/1997 | JP | 2003-275548 A | 9/2003 |
| JP | 09324067 | A | 12/1997 | JP | 2003266072 A | 9/2003 |
| JP | 10015365 | A | 1/1998 | JP | 2003275759 A | 9/2003 |
| JP | 10024222 | A | 1/1998 | JP | 2003340250 A | 12/2003 |
| JP | 10033955 | A | 2/1998 | JP | 2004-008981 | 1/2004 |
| JP | 10048466 | A | 2/1998 | JP | 2004073950 A | 3/2004 |
| JP | 10076144 | A | 3/1998 | JP | 2004-230287 A | 8/2004 |
| JP | 10076264 | A | 3/1998 | JP | 2004216263 A | 8/2004 |
| JP | 10085562 | A | 4/1998 | JP | 2004230280 A | 8/2004 |
| JP | 10085565 | A | 4/1998 | JP | 2004322100 A | 11/2004 |
| JP | 10085566 | A | 4/1998 | JP | 2004-536710 A | 12/2004 |
| JP | 10156149 | A | 6/1998 | JP | 2004337730 A | 12/2004 |
| JP | 10180048 | A | 7/1998 | JP | 2005-502467 A | 1/2005 |
| JP | 10225685 | A | 8/1998 | JP | 2005-087887 A | 4/2005 |
| JP | 10235168 | A | 9/1998 | JP | 2005144291 A | 6/2005 |
| JP | 10249171 | A | 9/1998 | JP | 2005154551 A | 6/2005 |
| JP | 10286441 | A | 10/1998 | JP | 2005279447 A | 10/2005 |
| JP | 10328538 | A | 12/1998 | JP | 2006-116495 | 5/2006 |
| JP | 11005023 | A | 1/1999 | JP | 2007-547083 | 8/2010 |
| JP | 11028467 | A | 2/1999 | JP | 4833353 B2 | 12/2011 |
| JP | 11033365 | A | 2/1999 | KR | 20-0232145 | 7/2001 |

| | | |
|---|---|---|
| KR | 1020020067227 | 8/2002 |
| KR | 20-0295350 | 11/2002 |
| KR | 2002-0090967 | 12/2002 |
| KR | 2003-033812 | 5/2003 |
| KR | 2003-060625 | 7/2003 |
| KR | 2005-063478 | 6/2005 |
| NL | 1006390 C2 | 12/1998 |
| NL | 1020491 | 10/2003 |
| NL | 1021197 | 10/2003 |
| NZ | 510394 A | 5/2003 |
| NZ | 537874 A | 2/2007 |
| TW | 347343 | 12/1998 |
| WO | 8501449 A1 | 4/1985 |
| WO | 8605116 A1 | 9/1986 |
| WO | 8605705 A1 | 10/1986 |
| WO | 8800494 A1 | 1/1988 |
| WO | 8801529 A1 | 3/1988 |
| WO | 8801895 A1 | 3/1988 |
| WO | 8806200 A1 | 8/1988 |
| WO | 8900880 A1 | 2/1989 |
| WO | 9000434 A1 | 1/1990 |
| WO | 9104783 A1 | 4/1991 |
| WO | 9116124 A1 | 10/1991 |
| WO | 9302779 A1 | 2/1993 |
| WO | 9315827 A1 | 8/1993 |
| WO | 9323152 A1 | 11/1993 |
| WO | 9411094 A1 | 5/1994 |
| WO | 9534424 A1 | 12/1995 |
| WO | 9603202 A1 | 2/1996 |
| WO | 9607470 A1 | 3/1996 |
| WO | 9628236 A1 | 9/1996 |
| WO | 9629142 A1 | 9/1996 |
| WO | 9641676 A1 | 12/1996 |
| WO | 9706880 A2 | 2/1997 |
| WO | 9822204 A1 | 5/1998 |
| WO | 9825694 A1 | 6/1998 |
| WO | 9828066 A1 | 7/1998 |
| WO | 9853902 A1 | 12/1998 |
| WO | 9901207 A1 | 1/1999 |
| WO | 99-55448 A1 | 11/1999 |
| WO | 9959707 A1 | 11/1999 |
| WO | 0018498 A1 | 4/2000 |
| WO | 0030742 A1 | 6/2000 |
| WO | 0100307 A2 | 1/2001 |
| WO | 0105715 A1 | 1/2001 |
| WO | 0108790 A1 | 2/2001 |
| WO | 0119414 A1 | 3/2001 |
| WO | 0132299 A1 | 5/2001 |
| WO | 0136075 A1 | 5/2001 |
| WO | 0143856 A1 | 6/2001 |
| WO | 0145829 A1 | 6/2001 |
| WO | 0230550 A1 | 4/2002 |
| WO | WO0226363 | 4/2002 |
| WO | 0240140 A1 | 5/2002 |
| WO | 0247800 A1 | 6/2002 |
| WO | 03000389 A2 | 1/2003 |
| WO | 03013706 A1 | 2/2003 |
| WO | 03024575 A1 | 3/2003 |
| WO | 03053552 A1 | 7/2003 |
| WO | 03057632 A1 | 7/2003 |
| WO | 03059495 A1 | 7/2003 |
| WO | 03068374 A1 | 8/2003 |
| WO | 03095078 A1 | 11/2003 |
| WO | 2004018084 A1 | 3/2004 |
| WO | 2004024304 A2 | 3/2004 |
| WO | 2004033078 A1 | 4/2004 |
| WO | 2004050221 A1 | 6/2004 |
| WO | WO2004056458 A3 | 7/2004 |
| WO | 2004078327 A1 | 9/2004 |
| WO | 2004101120 A1 | 11/2004 |
| WO | 2005005028 A1 | 1/2005 |
| WO | 2005021140 A1 | 3/2005 |
| WO | 2005028085 A1 | 3/2005 |
| WO | 2005028086 A1 | 3/2005 |
| WO | 2005037414 A1 | 4/2005 |
| WO | 2005046849 A1 | 5/2005 |
| WO | 2005077499 A1 | 8/2005 |
| WO | 2005082498 A1 | 9/2005 |
| WO | WO2005107929 | 11/2005 |
| WO | 2006026814 A1 | 3/2006 |
| WO | 2006029456 A1 | 3/2006 |
| WO | 2006029465 | 3/2006 |
| WO | 2006047814 A1 | 5/2006 |
| WO | 2006066350 A1 | 6/2006 |
| WO | 2007053528 A2 | 5/2007 |
| WO | 2007065956 A1 | 6/2007 |
| WO | 2007135087 A1 | 11/2007 |
| WO | 2008034570 A1 | 3/2008 |
| WO | 2008071516 A1 | 6/2008 |
| WO | 2008141080 A1 | 11/2008 |
| WO | 2008153818 A1 | 12/2008 |
| WO | 2009030405 A1 | 3/2009 |

OTHER PUBLICATIONS

Anonymous, "Nonwoven Constructions of Dyneon"THV and Dyneon "THE Fluorothermoplastics", Research Disclosure Journal, Apr. 1999, RD 420013, 2 pages.

MicroC™—Carbon Source for Wastewater Denitrification. Information from Environmental Operating Solutions website including MSDS.

"Chemical Cleaning Definition", Lenntech BV, Lenntech Water treatment & purification Holding B.V., Chemical Cleaning.

Mark et al., "Peroxides and Peroxy Compounds, Inorganic" Kirk—Othmer Encyclopedia of Chemical Technology, Peroxides and Peroxy Compounds, Inorganic, To Piping Systems, New York, Wiley & Sons, Ed., Jan. 1, 1978, pp. 14-18.

Webster's Ninth New Collegiate Dictionary, Merriam-Webster Inc., Publishers, Springfield, Massachusetts, USA, Copyright 1986, p. 1298.

Canadian Office Action dated Oct. 24, 2011 for Application No. 2,579,894, 5 pages.

Japanese Office Action dated Oct. 18, 2011 for Application No. 2007-531536, 5 pages (translation).

Coulson et al., "Coulson and Richardson's Chemical Engineering," 1999, vol. 1, pp. 358-364.

Cui et al., "Airlift crossflow membrane filtration—a feasibility study with dextran ultrafiltration," J. Membrane Sci. (1997) vol. 128, pp. 83-91.

Almulla et al., Desalination, 153 (2002), pp. 237-243.

Anonymous, "Nonwoven Constructions of Dyneon "THV and Dyneon "THE Fluorothermoplastics", Research Disclosure Journal, Apr. 1999, RD 420013, 2 pages.

Cote et al., Wat. Sci. Tech. 38(4-5) (1998), pp. 437-442.

Cote, et al. "A New Immersed Membrane for Pretreatment to Reverse Osmosis" Desalination 139 (2001) 229-236.

Craig, Jones, "Applications of Hydrogen Peroxide and Derivatives," The Royal Society of Chemistry, Cambridge, UK 1999 Chapters 2 and 5.

Crawford et al., "Procurement of Membrane Equipment: Differences Between Water Treatment and Membrane Bioreactor (MBR) Applications" (2003).

Davis et al., Membrane Technology Conference, "Membrane Bioreactor Evaluation for Water Reuse in Seattle, Washington" (2003).

DeCarolis et al., Membrane Technology Conference, "Optimization of Various MBR Systems for Water Reclamation" (2003).

Delgrange-Vincent, N. et al., Desalination 131 (2000) 353-362.

Dow Chemicals Company, "Filmtec Membranes—Cleaning Procedures for Filmtec FT30 Elements," Tech Facts, Online, Jun. 30, 2000, XP002237568.

Husain, H. et al., "The ZENON experience with membrane bioreactors for municipal wastewater treatment," MBR2: Membr. Bioreact. Wastewater Treat., 2nd Intl. Meeting; School of Water Sciences, Cranfield University, Cranfield, UK, Jun. 1999.

Johnson, "Recent Advances in Microfiltration for Drinking Water Treatment," AWWA Annual Conference, Jun. 20-24, 1999, Chicago, Illinois, entire publication.

Kaiya et al., "Water Purification Using Hollow Fiber Microfiltration Membranes," 6th World Filtration Congress, Nagoya, 1993, pp. 813-816.

Kang et al. "Characteristics of microfiltration membranes in a membrane coupled sequencing batch reactor system" Water Research, Elsevier, Amsterdam, NL, vol. 37, No. 5, Mar. 2003.

Lloyd, D.R. et al. "Microporous Membrane Formation Via Thermally Induced Phase Separation/Solid-Liquid Phase Separation" Journal of Membrane Science (Sep. 15, 1990), pp. 239-261, vol. 52, No. 3, Elsevier Scientific Publishing Company, Amsterdam, NL.

Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.

MicroCTM -Carbon Source for Wastewater Denitrification. Information from Environmental Operating Solutions website including MSDS.

Nakayama, "Introduction to Fluid Mechanics," Butterworth-Heinemann, Oxford, UK, 2000.

Ramaswammy S. et al. "Fabrication of Ply (ECTFE) Membranes via thermally induced phase Separation", Journal of Membrane Science, (Dec. 1, 2002), pp. 175-180, vol. 210 No. 1, Scientific Publishing Company, Amsterdam, NL.

Rosenberger et al., Desalination, 151 (2002), pp. 195-200.

U.S. Appl. No. 60/278,007, filed Mar. 23, 2001.

Ueda et al., "Effects of Aeration on Suction Pressure in a Submerged Membrane Bioreactor," Wat. Res. vol. 31, No. 3, 1997, pp. 489-494.

Water Encyclopedia, edited by Jay Lehr, published by John Wiley & Sons, Inc., Hoboken, New Jersey, 2005. Available at http://wwwm-mrw.interscience.wiley.com/eow/.

White et al., The Chemical Engineering Journal, 52 (1993), pp. 73-77.

Wikipedia, "Seawater," available at http://en.wikipedia.org/wiki/Seawater, Jul. 15, 2007.

Yamamoto et al., Water Science Technology, vol. 2, pp. 43-54; 1989.

Yoon: "Important operational parameters of membrane bioreactor-sludge disintegration (MBR-SD) system for zero excess sludge production" Water Research, Elsevier, Amsterdam, NL, vol. 37, No. 8, Apr. 2003.

Zenon, "Proposal for ZeeWeed® Membrane Filtration Equipment System for the City of Westminster, Colorado, Proposal No. 479-99," Mar. 2000, entire publication.

Supplementary European Search Report dated Mar. 9, 2009 for corresponding Application No. EP 05 77 9009.

Chinese Office Action for corresponding Application No. 200580034576.9.

* cited by examiner

CONTINUOUSLY VARIABLE AERATION

TECHNICAL FIELD

The present invention relates to membrane filtration systems and more particularly, to the use of aeration to control fouling of the membranes in such systems.

BACKGROUND OF THE INVENTION

In submerged or immersed membrane filtration systems aeration using gas, typically air, is often employed on a continuous basis to control fouling. This is particularly the case for wastewater bioreactors. Other prior art systems utilise cycles of high gas flows followed by a lower gas flow or no gas flow. Mixtures of liquid/gas have also been used to scour the membranes and provide a reduction in gas consumption.

There are several problems with the cycling approach:

1. The cycle frequencies are typically very high, as it is not good to have the gas off in the process for too long as fouling increases rapidly during this phase. High cycle frequencies increase wear on valves that are required to cycle between multiple cells or membrane tanks, so as to keep the overall gas flow more or less constant from the blower. There are also practical limits to how fast the valves can be cycled between on and off caused by limitations of valve design and the time it takes to accelerate the gas flow.

2. When the gas is off for one cell it provides an opportunity for sludge to flow back into the aerators which can cause clogging of the aerators over time.

3. The longer the time between cycles the more likely it is for fouling to increase and the sludge to go anoxic.

DISCLOSURE OF THE INVENTION

According to one aspect, the present invention provides a method of controlling fouling in a membrane filtration system of the type where gas is used to clean or scour the membranes wherein the method includes supplying the gas to the system with a continuously variable flow rate.

For preference the system includes a number of modules and the supply of gas to each module has a continuously variable flow rate. Alternatively, the system may include a number of sets of modules and the supply of gas to each set of modules has a continuously variable flow rate. Optionally, the system may include a number of membrane tanks with each tank containing modules in sets. The supply of gas to each membrane tank and the sets of modules therein has a continuously variable flow rate.

Preferably the continuously variable gas flow rate, ranges from a high flow to a low flow (or to zero). For preference, the flow rate pattern of the gas flow follows any continuously variable curve that achieves this result such as a sinusoidal or triangular wave. The varying gas flow not only provides the normal cleaning effect but the unstable nature of the gas flow has been found to provide an additional cleaning effect resulting from the inherent surges in flow.

According to another aspect, the present invention provides a membrane filtration system including one or more membranes, a source of gas for providing a gas flow to form bubbles which scour the surfaces of the membrane, wherein said source of gas provides said gas flow at a continuously variable flow rate.

In one form, the gas source is coupled to the filtration system via a flow control device and the flow control device varies the flow rate continuously. In another form, the gas supply itself is varied, for example by varying the drive speed in a gas blower. Various combinations of known valve arrangements may also be used to provide the continuously varying flow rate.

The invention may be applied to a variety of membrane filtration system and is particularly applicable to submerged or immersed membranes and may be used in pressurised and non-pressurised systems.

According to another aspect, the present invention provides a flow control device for use in the control of the flow of aerating gas in a membrane filtration system, said flow control device including a housing having an inlet port and one or more outlet ports, a movable valve member for providing a continuously variable flow from said inlet port to said one or more outlet ports.

The housing may also be provided with a plurality of inlet ports.

Where a number of membrane modules or cells are used within the membrane filtration system, a flow control device may be used having separate outlets connected to associated modules such that as the flow rate is being increased to one module or modules it is being reduced to another module or modules.

Preferably, the flow control device is a rotating or reciprocating valve.

The flow control device may also provide a variable distribution of gas to one location. Distribution of the gas to each outlet port can be of continuously varying flow or an on/off flow. A feature of the flow control device is that it operates in a continuously rotating manner, not an open/close static manner. In the present application, the flow control device is used to provide a continuously variable flow rate of gas to one or more locations.

In a preferred form, the rotating valve is made up of three main components, the valve housing, the rotating distributor and the drive motor. The valve housing is mounted to the motor and contains the inlet and outlet ports of the valve. The distributor is located within the valve housing and is driven by the motor. As the distributor rotates within the valve housing, it closes and opens the housing outlets and thereby directs gas out one outlet or out another.

The number of outlet ports within the housing can vary, thus providing control of the airflow to any desired number of locations.

The shape of the distributor can be varied to suit the number of outlet ports and to control the rate of airflow distributed through each outlet port.

Hence the valve may be used to control gas flow to a number of membrane modules or cells and optimize the total volume of gas used.

The valve is able to complete the function that would normally be achieved by a combination of standard valves.

The valve has negligible operating friction and therefore has a long operating life expectancy.

The valve operates in a continuous rotating manner and can therefore cycle at a wide range of frequencies; typically 60 to 0.05 Hz.

BRIEF DESCRIPTION OF DRAWINGS

Preferred embodiments of the invention will now be described, by way of example only, with reference to the accompanying drawings in which.

DESCRIPTION OF PREFERRED EMBODIMENTS

Figure 1:
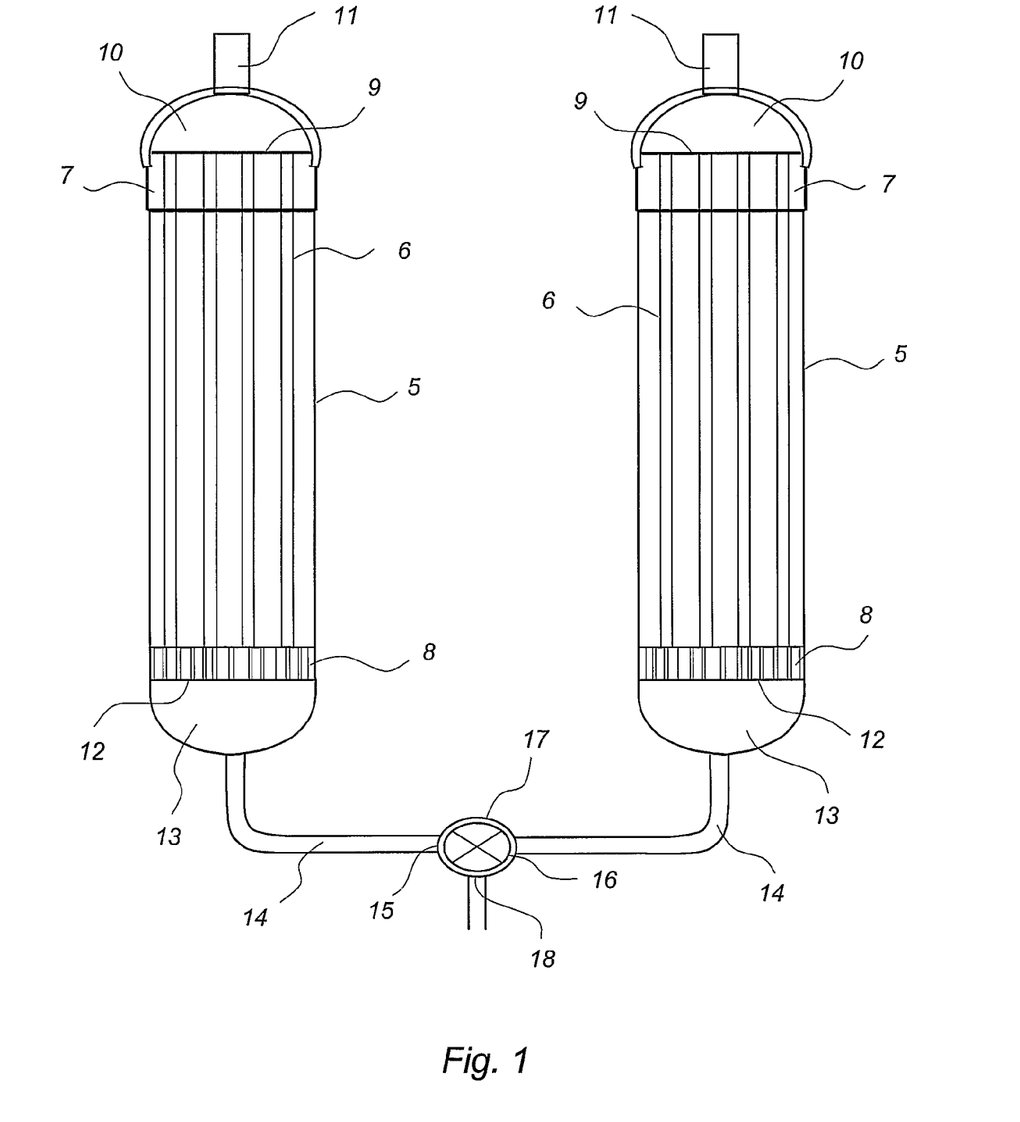
FIG. 1 shows a schematic drawing of one embodiment of a filtration system according to the invention.

Referring to FIG. 1, a pair of typical membrane filtration modules 5 is shown. Each module 5 includes a plurality of hollow fibre membranes 6 extending between upper and lower headers 7 and 8. Filtrate is withdrawn from the upper header 7 through the open ends 9 of fibre membranes 6 which open into collection chamber 10 connected to outlet 11. The lower header 8 has a plurality of openings 12 connected to a chamber 13 which in turn is connected to an inlet pipe 14. Each pipe 14 is connected to a respective outlet port 15 and 16 of a rotating valve 17. The valve 17 has an inlet port 18 connected to a source of pressurised gas, typically an air blower or pump (not shown).

Figure 2:
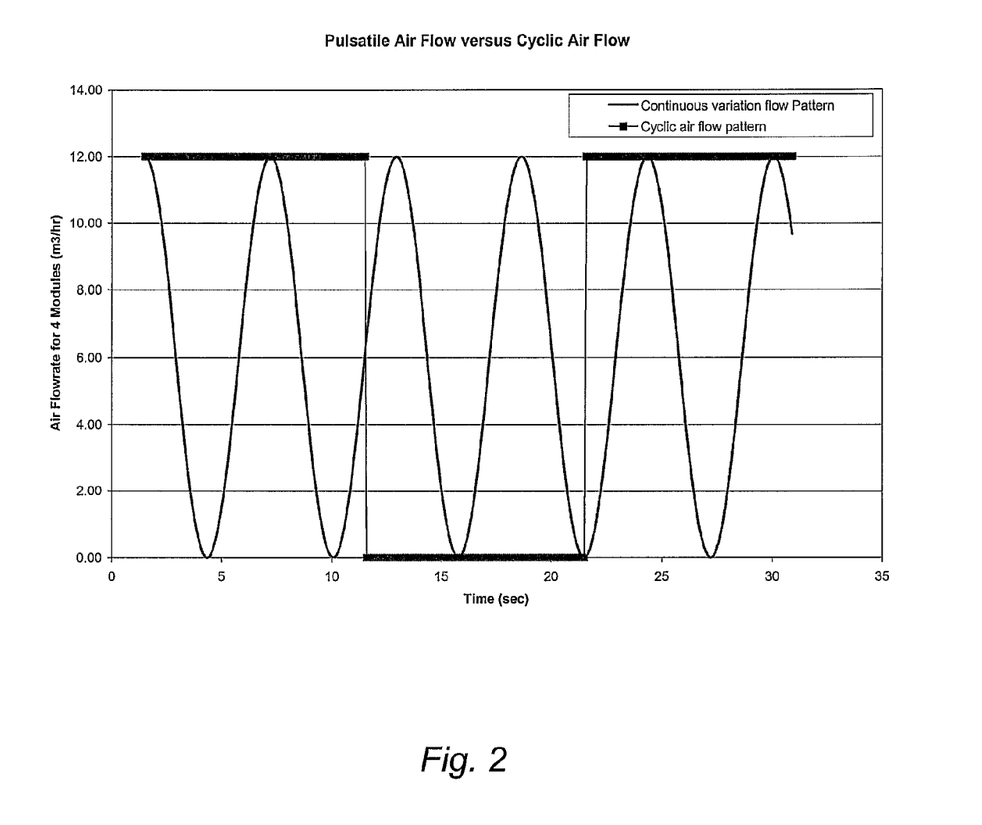
FIG. 2 shows a graph of air flow-rate over time for continuous variation versus cyclic variation of airflow.

The ideal gas flow pattern for continuous variation of the gas flow rate of gas used in scouring the membranes against a cyclic gas flow pattern is shown in FIG. 2.

Figure 3:
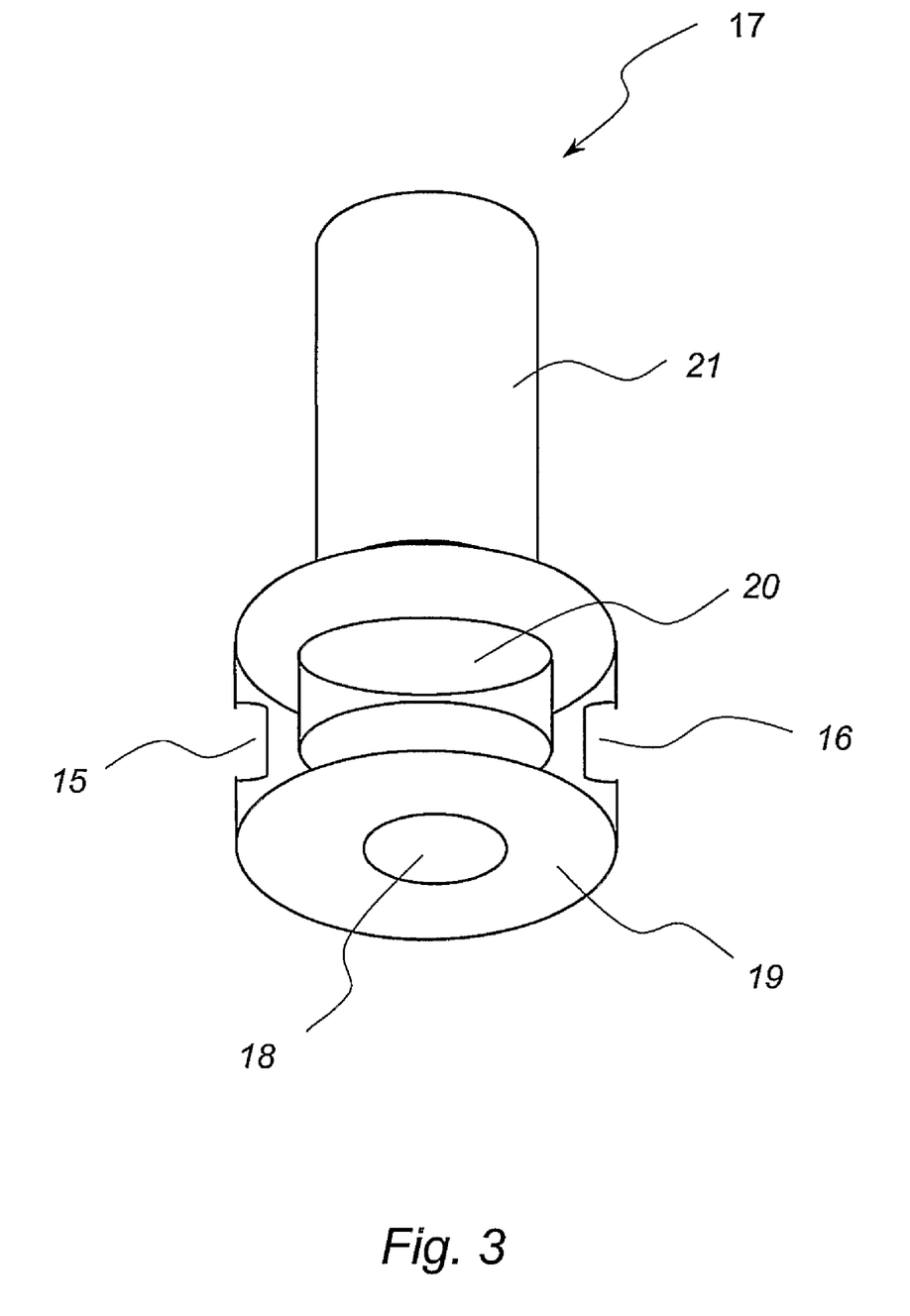
FIG. 3 shows a perspective cutaway view of the rotating valve which may be employed in the invention.

FIG. 3 shows the rotating valve 17 in more detail. The valve 17 comprises a valve housing 19 with a rotating distributor 20 rotatably mounted therein and driven by a motor 21. The housing 19, in this embodiment has a centrally located inlet port 18 and two outlet ports 15 and 16, though it will be appreciated that the number of ports can be varied to suit different applications.

In operation, gas is supplied to inlet port 18 of the rotating valve 17. The distributor 20 continuously rotates within the housing 19 slowly opening one outlet port to the inlet pipe 14 of one module 5, increasing to full flow, then slowly restricting the flow and eventually closing it at the same time as the flow path reaches fully open on the next module 5. It will be appreciated that any number of modules can be used and the appropriate number of outlet ports can be provided in the valve housing 19. The cycling period of the gas flow can be readily adjusted by altering the speed of rotation of the distributor 20.

The gas supplied to the inlet pipe 14 is fed through openings 12 to scour the membranes in the normal manner.

Figure 4:
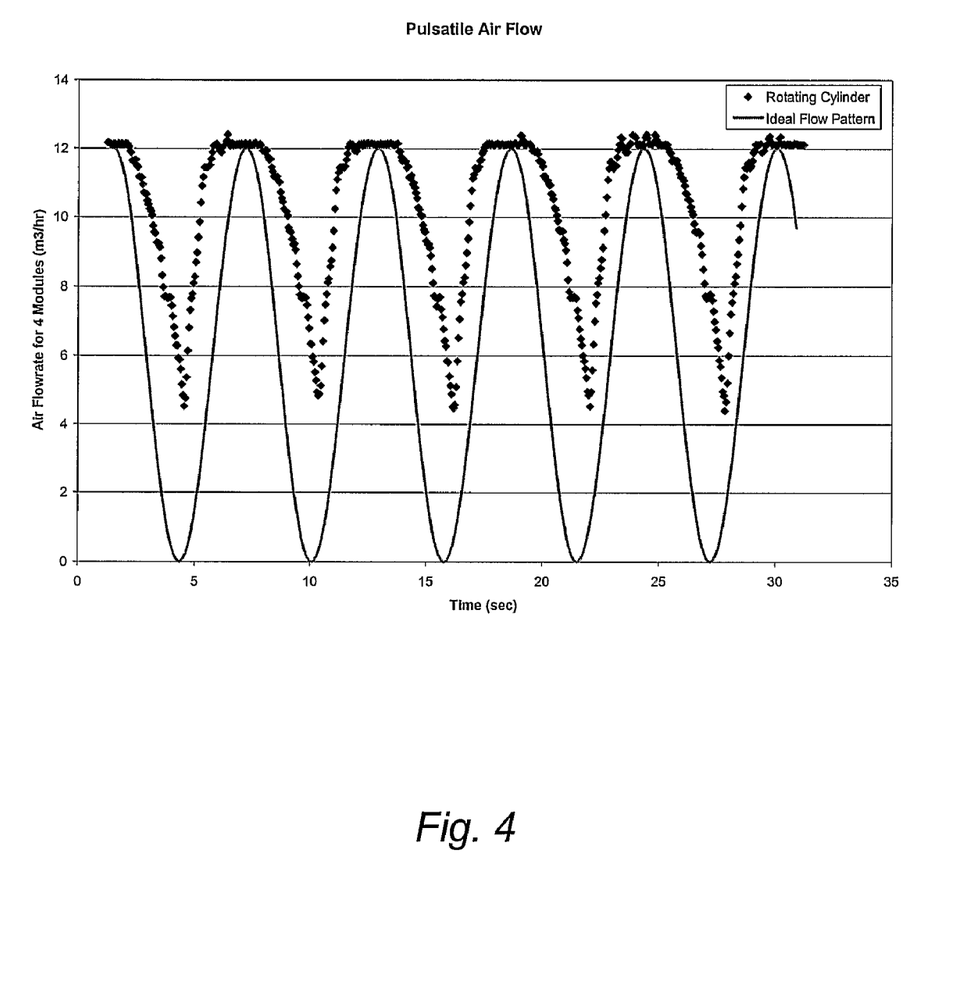
FIG. 4 shows a graph of air flow rate over time for the rotating valve of the time illustrated in FIG. 3 against the ideal continuous flow pattern.

FIG. 4 shows a graph of the gas flow rate produced by the rotating valve of FIG. 3. The small plateaus in the pattern were produced by minor leakage of the cylinder and the pattern will approximate the ideal flow rate if this leakage is minimised.

Figure 5:
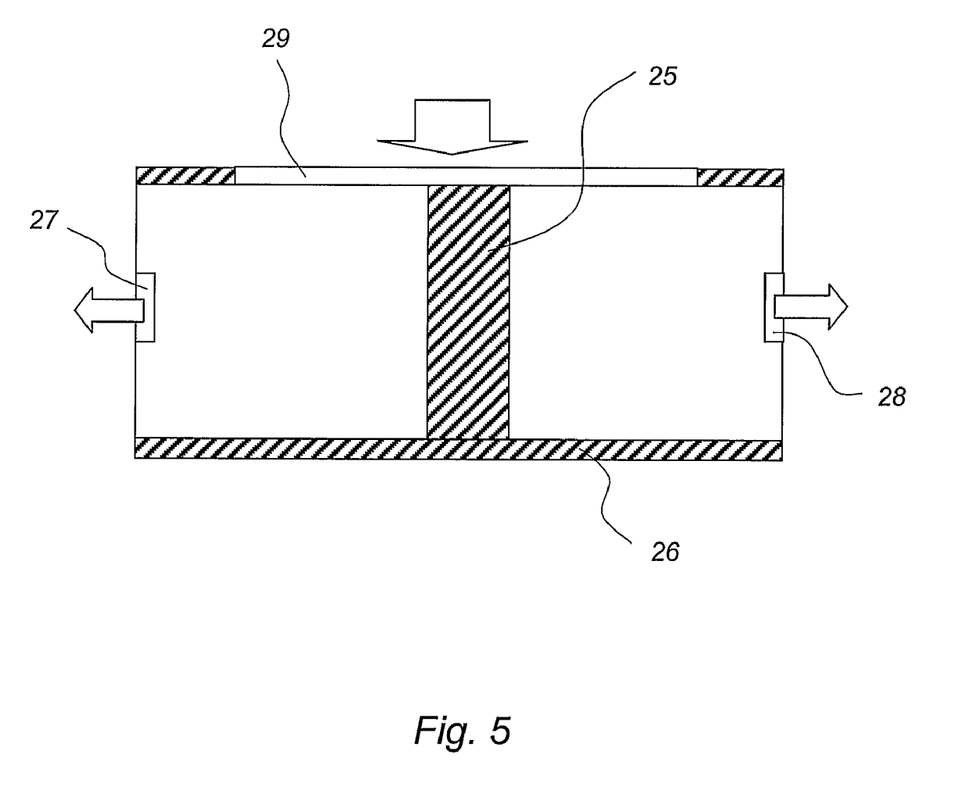
FIG. 5 shows a schematic sectional elevation view of a further type of valve which may be used to produce continuous variation in air flow rate.

FIG. 5 shows an alternate embodiment of a continuous flow rate valve. In this embodiment a piston 25 is slidably mounted in a tubular valve body 26 having outlet ports 27 and 28 at either end and an inlet port or opening 29 in the wall of the valve body 26. Typically the valve body 26 would be cylindrical in shape though other cross-sectional shapes could be used.

In use, the piston 25 reciprocates within the valve body 26 so as alternately fully open the input port 29 to output ports 27 and 28, respectively. The range of piston movement is arranged such that when port 29 is fully open to port 27 it is fully closed to port 28 and vice versa. As the piston 25 moves between its limits the gas flow to one outlet port is gradually increased while the gas flow to the other outlet port is correspondingly reduced.

Figure 6:
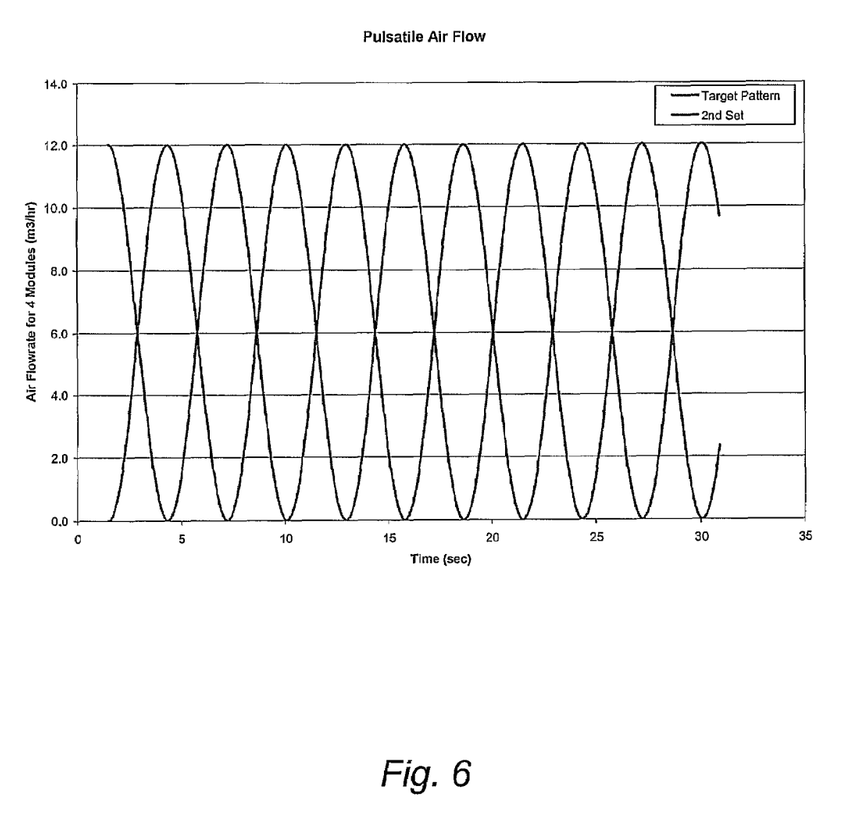
FIG. 6 shows a graph of air flow rate over time for a valve of the type illustrated in FIG. 5.

FIG. 6 illustrates the pattern of continuously variable gas flow rate produced by the valve arrangement of FIG. 5.

Figure 7:
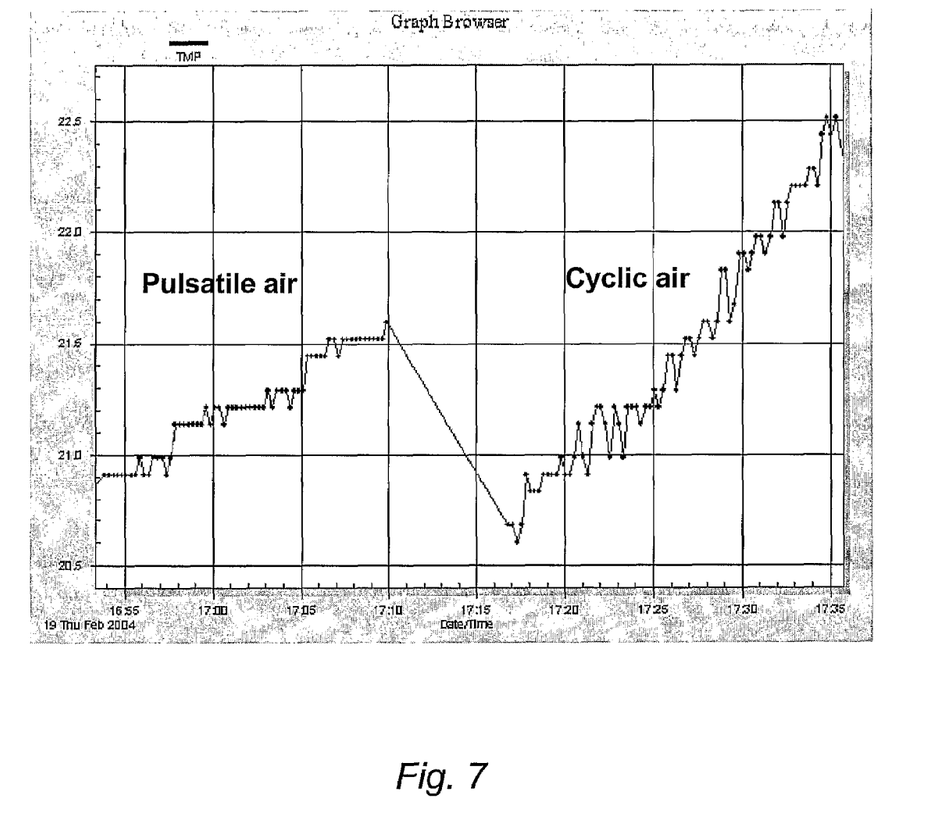
FIG. 7 shows a graph of transmembrane pressure (TMP) over time for a filtration module first having scouring by continuous variation in air flow rate and secondly having a cyclic flow rate.

FIG. 7 shows the effect of continuous variable gas flow rate on the scouring process. The first part of the graph shows change in transmembrane pressure (TMP) with a continuously varying gas flow rate (pulsatile flow) to the membranes while the second portion of the graph illustrates change in TMP with a cyclic gas flow rate. As more efficient scouring produces a more stable TMP over time, it is clear from this graph that the continuously variable gas flow rate produces a more efficient scouring effect and a more stable TMP over time than the cyclic flow rate scouring.

The advantages which may be typically provided by the method and system according the embodiments of the invention are:

1. The gas flow is only at the low or zero point for a very short period of time. This minimises the opportunity for backflow of sludge within the filtration system.
2. The essentially continuous flow of gas also means that the period of the cleaning/scouring cycles may be extended over the conventional "alternating" approach. This is achievable because the gas flow is not in the low or no flow condition for very long so there is less likelihood of sludge settling and for anoxic conditions to develop.
3. The process may be employed by using a variable speed drive on a blower and programming the flow cycle profile, in which case there would be no valve issues, as they are not required to cycle. Or alternatively, if conventional valves are used to control the cycles, then the longer period that the process enables means less wear of the valves.
4. The process may also be employed by using a rotary valve described in the preferred embodiment. In this embodiment the blower runs at essentially constant speed, and the valve rotates continuously. There is no sudden open close action on the valve and only the one valve is required.
5. Using the rotary valve above also enables much shorter cycle periods to be obtainable by increasing the speed of the valve rotation.
6. There is a potential saving in gas requirements of up to 50%.

It will be appreciated that further embodiments and exemplifications of the invention are possible without departing from the spirit or scope of the invention described.

The invention claimed is:

1. A method of controlling fouling in a membrane filtration system having at least one membrane extending between a lower header comprising a plurality of openings and an upper header, the method comprising:
   providing a source of a gas;
   controlling delivery of the gas to the membrane filtration system at a continuously variable flow rate comprising one of a sinusoidal and triangular wave flow pattern;
   passing the gas at the continuously variable flow rate through at least one inlet pipe to the plurality of openings in the lower header; and
   contacting the at least one membrane with the gas at the continuously variable flow rate to produce a stable transmembrane pressure over time.

2. The method according to claim 1, wherein the continuously variable gas flow rate ranges from about zero $m^3$ per hour to about 12 $m^3$ per hour.

3. The method according to claim 1, wherein controlling delivery of the gas provides a sinusoidal flow rate pattern through the at least one inlet pipe.

4. The method according to claim 1, wherein controlling the delivery of the gas provides a triangular wave flow pattern through the at least one inlet pipe.

5. The method according to claim 1, further comprising simultaneously increasing the gas flow rate through a first inlet pipe to a first membrane module and decreasing the flow rate of gas through a second inlet pipe to a second membrane module.

6. The method according to claim 1, wherein controlling the delivery of the gas to the membrane filtration system at a continuously variable flow rate comprises simultaneously opening a first outlet of a valve and closing a second outlet of the valve.

7. The method according to claim 1, wherein a period of time between a maximum flow rate and a minimum flow rate is less than five seconds.

8. A membrane filtration system comprising:
    at least one membrane extending between a lower header comprising a plurality of openings and an upper header;
    a source of a gas; and
    a flow control device comprising at least one of a rotating valve and a variable speed blower to provide the gas at a continuously variable flow rate comprising one of a sinusoidal and a triangular wave flow rate pattern, and the flow control device fluidly connected to the lower header to allow the gas to pass through the plurality of openings in the lower header at the continuously variable flow rate and contact the at least one membrane;
    the flow control device being programmed or operable such that the gas flow produces a stable transmembrane pressure over time.

9. The membrane filtration system according to claim 8, wherein the flow control device fluidly connects to the source of the gas.

10. The membrane filtration system according to claim 8, wherein the rotating valve comprises a housing having an inlet port, at least one outlet port, and a movable valve member for providing a continuously variable flow from the inlet port to the at least one outlet port.

11. The membrane filtration system according to claim 10, further comprising a motor operatively coupled to the movable valve member.

12. The membrane filtration system according to claim 10, wherein the housing comprises a plurality of inlet ports.

13. The membrane filtration system according to claim 8, wherein the rotating valve is constructed and arranged to fully open a first outlet port when a second outlet port is fully closed.

14. The system according to claim 8, further comprising a chamber located proximate the lower header and constructed and arranged to receive the gas from the flow control device and deliver the gas to the at least one membrane through the plurality of openings in the lower header.

* * * * *